United States Patent [19]
Walls

[11] Patent Number: 5,731,782
[45] Date of Patent: Mar. 24, 1998

[54] RANGING SYSTEMS

[75] Inventor: Raymond John Walls, Chelmsford, United Kingdom

[73] Assignee: GEC-Marconi Limited, Stanmore, United Kingdom

[21] Appl. No.: 489,933

[22] Filed: Feb. 27, 1990

[30] Foreign Application Priority Data

Mar. 3, 1989 [GB] United Kingdom ............ 8904884

[51] Int. Cl.$^6$ ............................................. G01S 13/32
[52] U.S. Cl. ........................ 342/145; 342/120; 342/162
[58] Field of Search ............................ 342/145, 120, 342/162

[56] References Cited

U.S. PATENT DOCUMENTS

| | | | |
|---|---|---|---|
| 3,337,870 | 8/1967 | Allen et al. | 342/145 X |
| 4,012,737 | 3/1977 | Waer et al. | 342/200 |
| 4,357,610 | 11/1982 | Kingston et al. | 342/145 X |
| 4,758,839 | 7/1988 | Goebel et al. | 342/132 |

FOREIGN PATENT DOCUMENTS

| | | |
|---|---|---|
| 0 020 197 | 12/1980 | European Pat. Off. . |
| 1 326 162 | 8/1973 | United Kingdom . |
| 1 351 096 | 4/1974 | United Kingdom . |

*Primary Examiner*—Gilberto Barron, Jr.
*Attorney, Agent, or Firm*—Spencer & Frank

[57] ABSTRACT

A continuous wave ranging system comprises a modulator for modulating an r.f. carrier signal in accordance with a pseudo random code, a transmitting antenna for radiating the signal towards a target, a receiving antenna and receiver for detecting the signal reflected from the target, a correlator for correlating the detected signal with the transmitted code with a selected phase shift corresponding to the current range gate to be tested, whereby the range of the target from the system may be determined, and filtering means for filtering from the output of the correlator those range gate amplitudes which vary with a frequency less than a predetermined value.

8 Claims, 4 Drawing Sheets

RANGING SYSTEMS

TECHNICAL FIELD

This invention relates to a continuous wave ranging system and, in one aspect, to an aircraft radar altimeter system.

PRIOR ART

Such systems usually comprise a means of microwave transmission upon which some form of coding has been added, an antenna for directing the energy to the target, an antenna for receiving the returned energy and, after amplification, a means of determining the amount of delay that has occurred on the signal, and hence the range of the target. The coding on the transmission had in the past been pulse or frequency modulation, but more recently phase modulation from a pseudo random code has been used. This form of modulation has the property of producing a noise-like transmitted spectrum which is difficult to detect and hence finds applications where covertness is of importance. Covertness can be enhanced by reducing the transmitted power such that the returned signal is just sufficient for ranging measurement.

In such phase-modulated systems, the received signal is correlated with a delayed version of the transmitted code, the delay being gradually increased in steps, and samples of the output of the correlator are detected and stored in an array. From this stored data, the delay, and hence the range, where the received signal return occurs can be found.

A common problem with such ranging systems is that there is often a relatively high level of unwanted signal that is cross-coupled directly from the transmitter to the receiver antenna, or which is reflected from structures around the antenna. Typically, this unwanted signal is 60 dB down on the transmitter output power, whereas the wanted signal from a remote object, or from the ground in an altimeter application, is 120 dB down. Pulse modulated systems may overcome this to some extent by blanking the receiver for a period when the transmitter is pulsed on, but this results in degradation of the short range performance. The system according to one aspect of the invention substantially reduces this problem.

SUMMARY OF INVENTION

According to the invention, a continuous wave ranging system comprises a modulator for modulating an r.f. carrier signal in accordance with a pseudo random code, a transmitting antenna for radiating the signal towards a target, a receiving antenna and receiver for detecting the signal reflected from the target, a correlator for correlating the detected signal with the transmitted code with a selected phase shift or delay corresponding to the current range gate to be tested, whereby the range of the target from the system may be determined, and filtering means for filtering from the output of the correlator those range gate amplitudes which vary with the frequency less than a predetermined value.

The invention is based upon the appreciation that a signal coming directly from the transmitter will be substantially constant in phase and amplitude, whereas one from a distant moving object or the ground in the case of an altimeter application, will vary due to the relative movement, which in the case of microwave transmission need only be of the order of a few millimeters.

Preferably, the system of the invention differentiates between fixed and moving returns by using twin channels (in phase and quadrature) on the output of the correlator. Each channel has an output for each of the delay steps of the correlator. For a given range gate, and thus delay, the outputs from I and Q are compared with results obtained from the running average of several previous readings of the particular range gate. The latest sample is subtracted from the I and Q averages. For a steady signal, the result is zero and thus filtering of steady signals from cross-coupling, for example, is achieved.

In a direct sequence spread spectrum ranging system, correlation sidelobes can appear at any range gate due to the transmitter-to-receiver breakthrough, or to wanted signals. The amplitude of the sidelobes is a function of, amongst other things, the amplitude of the breakthrough or wanted signal. With breakthrough being as much as 60 dB greater than the wanted signal the sidelobes due to the breakthrough can exceed the wanted signal. However, the sidelobes of the breakthrough will also be substantially constant in phase and amplitude and thus the system of the invention differentiates against them as well as the main fixed return.

To be effective the breakthrough must be constant for each range gate and must not be caused to vary by means of transmitter power control. Because each range gate is treated independently, this can be achieved by varying the power as a function of range gate only. Such a power control system overcomes the response time problems inherent in one relying on sensing returned signal levels and is less complicated than using logarithmic amplifiers.

With the process being carried out digitally, it is possible to include means whereby not only moving signals can be selected, but also fixed signals may be detected if they exceed a given level. For this to be achieved, a further set of processing would be carried out on the received signals after conversion to a digital format. These signals would be passed directly to secondary array without subtraction of the running average. The secondary array will then contain the levels of the returned signals for each of the code delays, irrespective of whether they were moving or not. The level of the return for breakthrough for each delay would be measured in the absence of true signals and this would form a threshold. Genuine signals from fixed targets could be detected if they exceeded this threshold. Such an arrangement would, for example, enable large fixed signals from the ground to be detected in the case of an altimeter whilst an aircraft was stationary on the ground. The ability to detect and measure the range of large signals complements the ability to measure moving targets in the presence of breakthrough.

The pseudo random code used in the invention is preferably a maximal length code, a sequence of numbers generated by a shift register with certain feedbacks on it. For the system of the present invention, a code length of 2047 digits is preferred.

BRIEF DESCRIPTION OF DRAWINGS

Reference is made to the drawings in which.

DETAILED DESCRIPTION OF PREFERRED EMBODIMENTS

Figure 1:
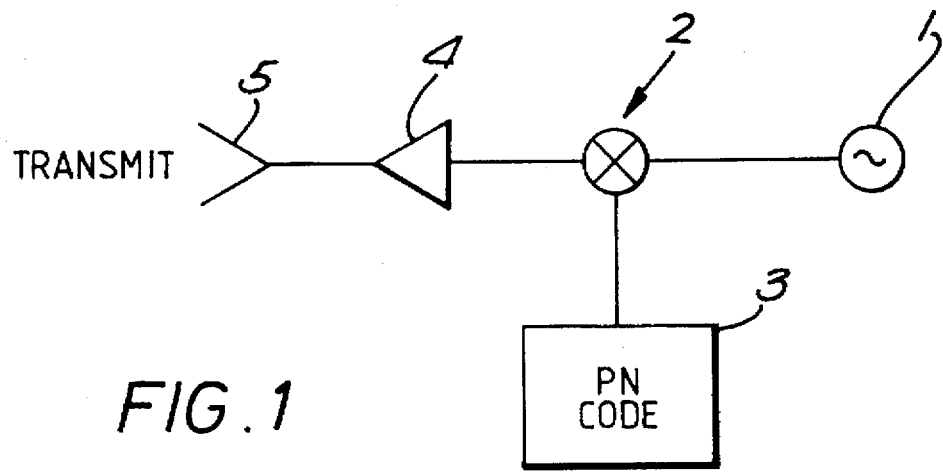
FIG. 1 is a simplified diagram of a continuous wave ranging system of the general type with which aspects of the present invention are concerned.
Figure 2:
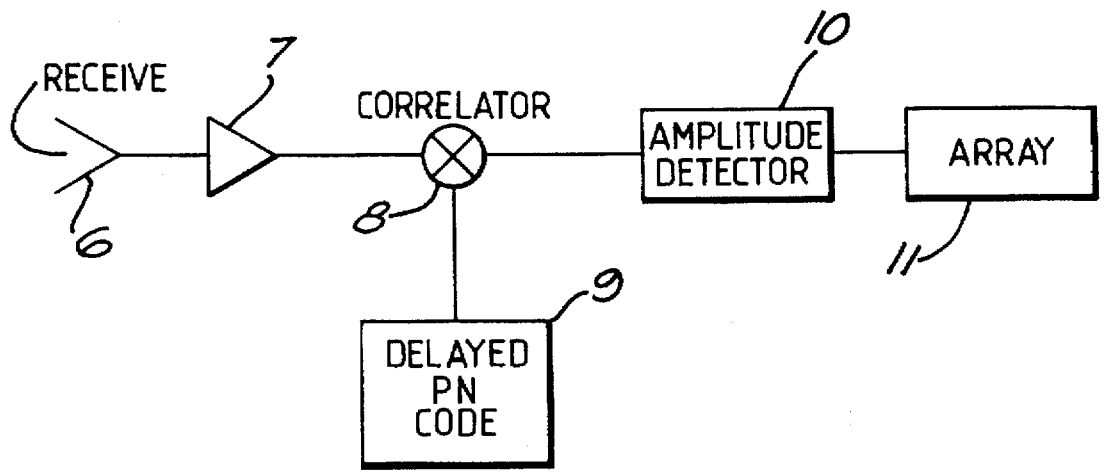
FIG. 2 illustrates the data stored in the array of the apparatus shown in FIG. 1.
Figure 2:
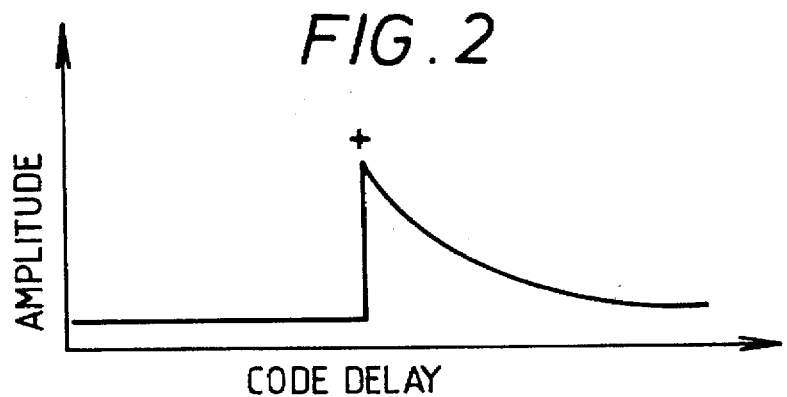

A continuous wave ranging system using phase modulation with a pseudo random (pn) code is illustrated by FIG. 1. The transmitting side has an r.f. carrier wave generator 1 supplying a phase modulator 2 controlled in accordance with a pn code from a code store 3. The modulated signal is amplified by an amplifier 4 and passed to a transmitting antenna 5. The receiving section comprises a receiving antenna 6, a receiving amplifier 7, and a correlator 8 supplied with the same pn code via a variable delay 9 which permits the code to be phase shifted by one digit, corresponding to a specific range, sequentially. A code may thus be considered as being divided into a series of "range gates" corresponding to the separate digits of the code and representing a distance step equal to the maximum range divided by the number of digits in the code, for example 2047. Generally, the code may be phase shifted or delayed significantly in steps of one digit of the code or fractions of a digit. Every value of delay stepped through represents a given range code and the output of the correlator of each step is a function of the returned signal from that given band of length or range gate. The maximum range is dependent on, inter alia, the length of the code sequence. The results of the correlation are passed to an amplitude detector 10 and are stored in an array 11. The stored data is as shown in FIG. 2 and shows the delay where the received signal return occurs (+).

Figure 3:
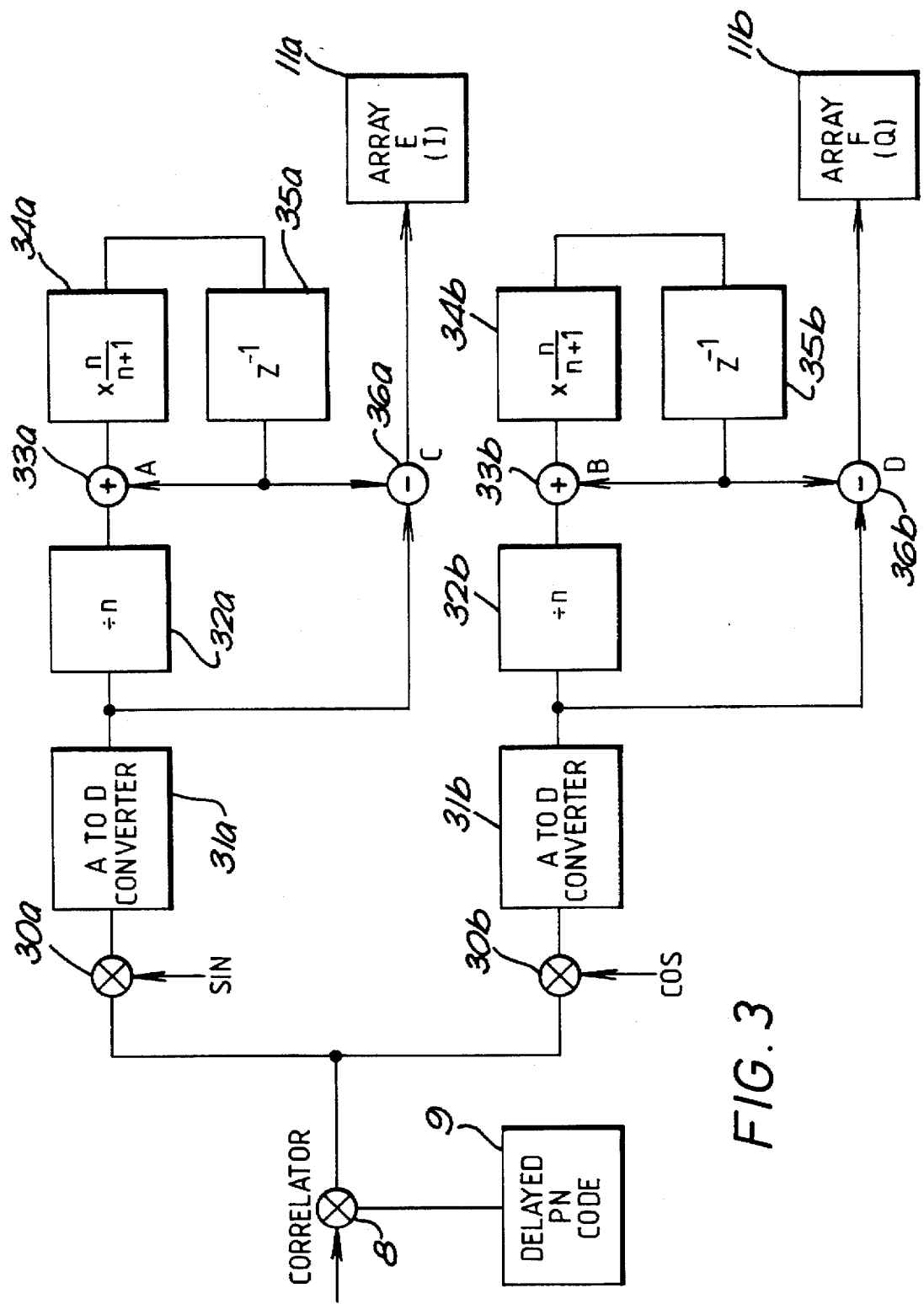
FIG. 3 is a diagrammatic illustration of the receiving and processing portion of a system in accordance with one aspect of the invention.
Figure 4:
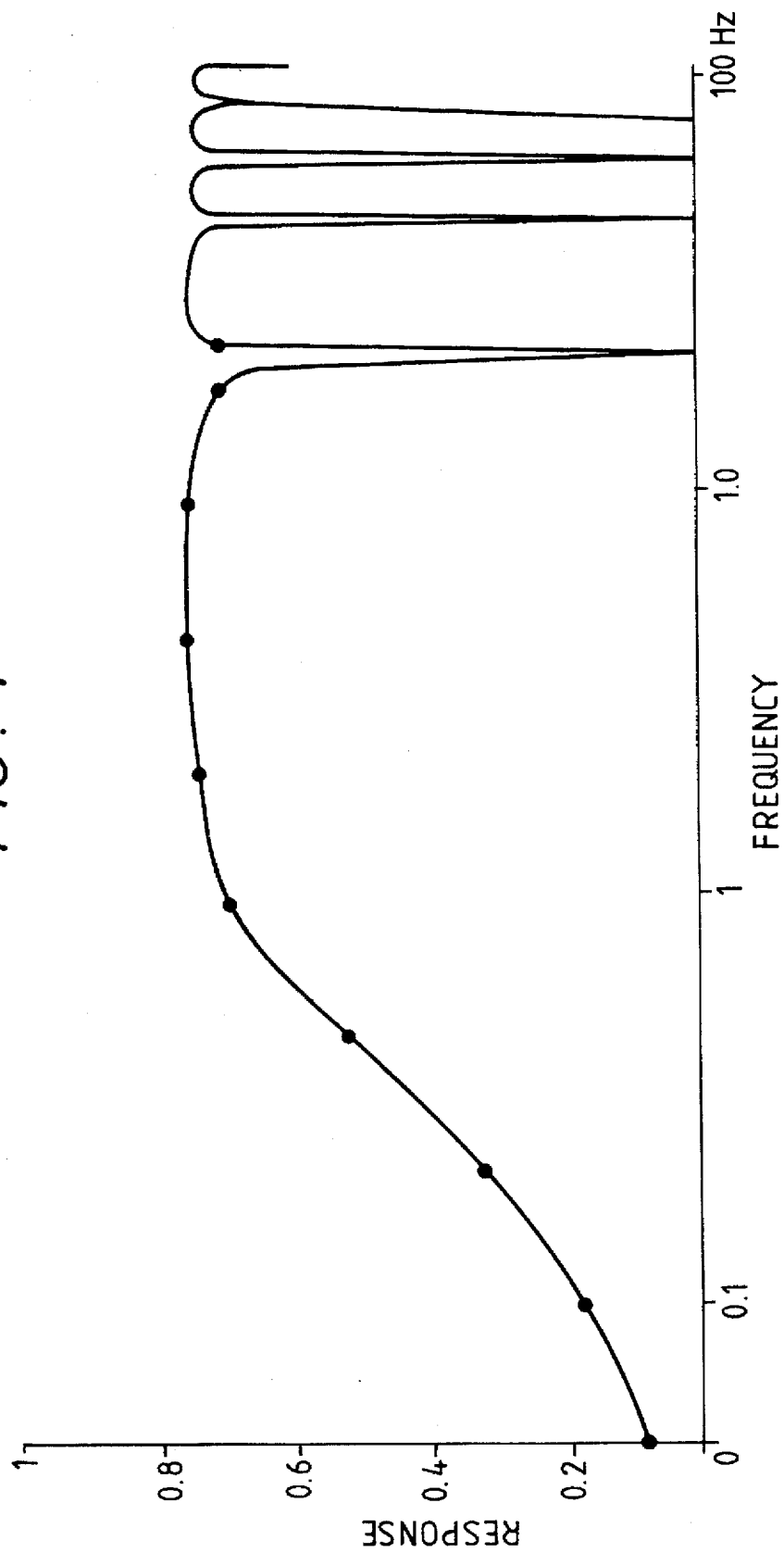
FIG. 4 is a diagram illustrating the response obtained with the system as shown in FIG. 3.

Referring now to FIG. 3, the delay of the pn code to the correlator is stepped cyclically over all the range gates to be examined. For each delay the output from the correlator is split into two channels and is mixed at 30a and 30b respectively with a sine and a cosine waveform to obtain the in-phase (I) and quadrature (Q) components of the energy received from targets at the range being examined. Analogue to digital converters 31a and 31b respectively convert the I and Q channels from analogue to a digital level, and from this point onward all processing is in digital form. The level of the current sampled received signal of a particular delay is divided at 32a and 32b respectively by n and added to a running average of previous samples of the same delay factored by n/(n+1). The addition is performed by adders 33a and 33b respectively, the factoring is carried out in stages 34(a or b respectively) and the running average is stored at 35a and 35b respectively. The running average represents the steady state components of a returned signal from a given range. The latest sample of the returned signal is subtracted at 36a and 36b respectively from the averages (I and Q). For a steady signal from cross-coupling or returns from a nearby structure, the cancellation at 36a and 36b would be complete and no output would be passed to the array. However, if the received signal varies from sample to sample, as will be the case for signals from a moving target, cancellation is not achieved and outputs pass to the array 11a and 11b respectively. In this way, the processing acts as a high pass filter with a response set by the value of n. The effect of the sampling is to place notches at the sampling frequency and at harmonics thereof. The overall response for such an arrangement is illustrated in FIG. 4, wherefore this example n is 7 and the sampling frequency 20 Hz. It can be seen that considerable attenuation is applied to steady "DC" signals and to signals of up to 0.1 Hz. After a complete cycle of samples has been taken, the array contains information of the levels of moving signals for each of the ranges being sampled, whilst rejecting steady unwanted signals from breakthrough.

Figure 5:
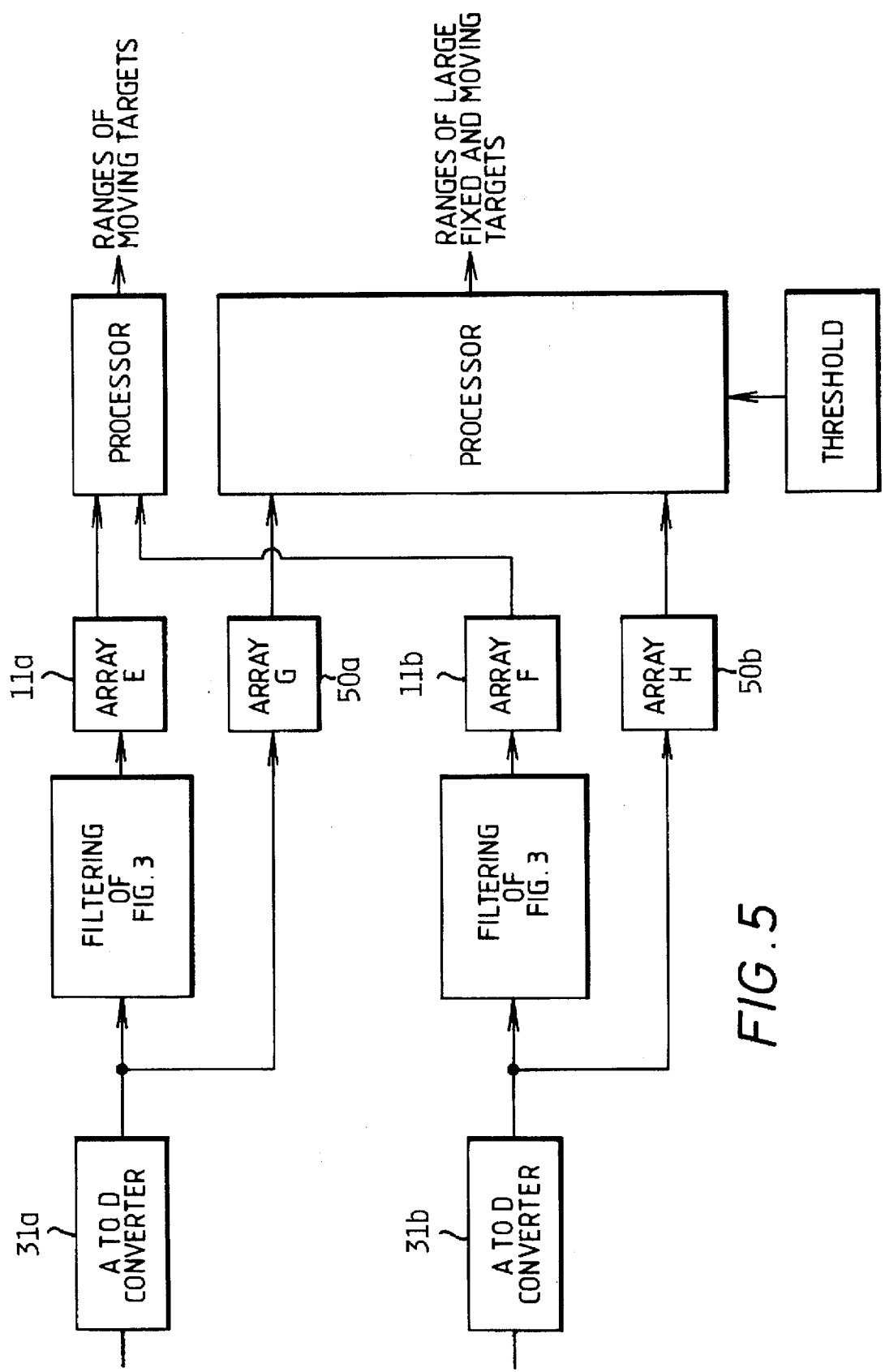
FIG. 5 illustrates an optional modification of the system shown in FIG. 3.

A modification to the system illustrated in FIG. 3 is illustrated by FIG. 5. A further set of processing is carried out on the received signals after conversion to a digital format. The signals are passed directly to secondary arrays 50a and 50b respectively without the subtraction of the running average. The secondary array 50a or 50b then contains the levels of the return signals for each of the code delays irrespective of whether they were moving or not. The level of the return from breakthrough for each delay would be measured in the absence of true signals and this would form a threshold.

We claim:

1. A continuous wave ranging system, comprising a modulator for modulating an r.f. carrier signal in accordance with a pseudo random code, a transmitting antenna for radiating the signal towards a target, a receiving antenna and receiver for detecting the signal reflected from the target, a correlator for correlating the detected signal with the transmitted code with a selected phase shift corresponding to the current range gate to be tested, whereby the range of the target from the system may be determined, and filtering means for filtering from the output of the correlator those range gate amplitudes which vary with a frequency less than a predetermined value.

2. A system according to claim 1, wherein the output from the correlator comprises twin channels, for phase and quadrature signals.

3. A system according to claim 2, comprising an analogue-to-digital converter for each channel.

4. A system according to claim 1, 2 or 3, wherein the filtering means comprises means for establishing a running average of the output, and means for subtracting the current output from the running average.

5. A system according to claim 3, wherein a further processing stage is provided to receive digital signals from the analogue-to-digital converter, the further processing stage comprising a store array for each channel arranged to store the returned signal for each code delay in the absence of the signals to establish a threshold, and means for comparing subsequently received signals with the threshold value to detect signals exceeding the threshold value.

6. A system according to claim 1, comprising means for varying the power of the signal radiated as a function of the range gate being tested.

7. A system according to claim 2, wherein the filtering means comprises means for establishing a running average of each output, and means for subtracting the current output from the running average.

8. A system according to claim 1, wherein the filtering means comprises means for establishing a running average of the output, and means for subtracting the current output from the running average.

* * * * *